(12) United States Patent
Fei et al.

(10) Patent No.: US 12,125,631 B2
(45) Date of Patent: Oct. 22, 2024

(54) SHIELDED ELECTRICAL TRANSFORMER

(71) Applicant: Google LLC, Mountain View, CA (US)

(72) Inventors: Chao Fei, San Jose, CA (US); Honggang Sheng, Milpitas, CA (US); Douglas Osterhout, San Jose, CA (US); Liang Jia, Palo Alto, CA (US); Srikanth Lakshmikanthan, Milpitas, CA (US)

(73) Assignee: Google LLC, Mountain View, CA (US)

( * ) Notice: Subject to any disclaimer, the term of this patent is extended or adjusted under 35 U.S.C. 154(b) by 1080 days.

(21) Appl. No.: 16/978,924

(22) PCT Filed: Aug. 5, 2019

(86) PCT No.: PCT/US2019/045140
§ 371 (c)(1),
(2) Date: Sep. 8, 2020

(87) PCT Pub. No.: WO2020/033325
PCT Pub. Date: Feb. 13, 2020

(65) Prior Publication Data
US 2021/0366647 A1      Nov. 25, 2021

Related U.S. Application Data

(60) Provisional application No. 62/715,008, filed on Aug. 6, 2018.

(51) Int. Cl.
*H01F 27/28* (2006.01)
*H01F 27/36* (2006.01)
(Continued)

(52) U.S. Cl.
CPC ......... *H01F 27/289* (2013.01); *H01F 27/361* (2020.08); *H01F 27/38* (2013.01); *H02M 1/44* (2013.01); *H02M 7/04* (2013.01)

(58) Field of Classification Search
CPC ...... H01F 27/289; H01F 27/361; H01F 27/38; H01F 2017/008; H01F 2027/2809;
(Continued)

(56) References Cited

U.S. PATENT DOCUMENTS 9,129,736 B2    9/2015   Zhou et al.
9,177,714 B2    11/2015  Espino
(Continued)

FOREIGN PATENT DOCUMENTS

CN          108183019           6/2018

OTHER PUBLICATIONS

Chen et al., "An evaluation method of transformer behaviors on common-mode conduction noise in SMPS," 2011 IEEE Ninth International Conference on Power Electronics and Drive Systems, Dec. 2011, 782-786.
(Continued)

*Primary Examiner* — Shawki S Ismail
*Assistant Examiner* — Matthew T Sarles
(74) *Attorney, Agent, or Firm* — Kilpatrick Townsend & Stockton LLP

(57) ABSTRACT

Shielded electrical transformers and power converters using those transformers are disclosed. In some implementations, a shielded electrical transformer includes a magnetic core, a primary winding, a first secondary winding, and a second secondary winding. The transformer includes a first shielding winding that has a same voltage potential direction as the primary winding and is connected in series with the primary winding to carry current that passes through the primary winding. The transformer also includes a second shielding winding that has a voltage potential direction opposite the primary winding and is connected from primary ground to a floating terminal. The first secondary winding, the second secondary winding, the first shielding winding, and the
(Continued)

second shielding winding can each have an approximately equal number of turns.

19 Claims, 7 Drawing Sheets

(51) Int. Cl.
    *H01F 27/38*     (2006.01)
    *H02M 1/44*     (2007.01)
    *H02M 7/04*     (2006.01)

(58) Field of Classification Search
    CPC ...... H01F 27/2804; H01F 27/36; H01F 27/29; H01F 27/33; H01F 27/28; H01F 27/2885; H01F 27/42; H02M 1/44; H02M 7/04; H02M 1/0058; H02M 3/33592; Y02B 70/10
    See application file for complete search history.

(56) References Cited

U.S. PATENT DOCUMENTS

| | | | |
|---|---|---|---|
| 9,589,718 | B2 | 3/2017 | Yang et al. |
| 9,748,036 | B2 | 8/2017 | Zuo et al. |
| 2013/0235619 | A1* | 9/2013 | Zhou ............... H01F 27/2885 363/21.04 |
| 2014/0347159 | A1 | 11/2014 | Zhuang et al. |
| 2016/0134195 | A1* | 5/2016 | Song ............... H01F 27/2804 363/21.12 |
| 2017/0200552 | A1* | 7/2017 | Chung ............. H01F 27/2885 |
| 2018/0166205 | A1 | 6/2018 | James et al. |
| 2020/0357571 | A1* | 11/2020 | Hwang ............ H01F 27/325 |
| 2021/0327643 | A1* | 10/2021 | Fuchs .............. H01F 27/24 |
| 2021/0366644 | A1* | 11/2021 | Vidlin ............. H01F 27/24 |
| 2022/0102057 | A1* | 3/2022 | Yu ................. H05K 1/165 |
| 2023/0138281 | A1* | 5/2023 | Blecic ............. H01F 27/363 307/104 |
| 2023/0162905 | A1* | 5/2023 | Huang ............. H01F 27/2804 336/84 R |
| 2023/0260694 | A1* | 8/2023 | Yu ................. H01F 27/34 336/200 |

OTHER PUBLICATIONS

Choi et al., "Designing common-mode (CM) EMI noise cancellation without Y-capacitor," APEC 07-Twenty-Second Annual IEEE Applied Power Electronics Conference and Exposition, Feb. 2007, 936-940.

Chu et al., "A generalized common-mode current cancelation approach for power converters," IEEE Transactions on Industrial Electronics, Jan. 2015, 62(7):4130-40.

Cochrane et al., "Passive cancellation of common-mode noise in power electronic circuits," IEEE Transactions on Power Electronics, May 2003, 18(3):756-63.

Kang et al., "EMI reduction technique of flyback converter based on capacitance model of transformer with wire shield," 2015 9th International Conference on Power Electronics and ECCE Asia (ICPE-ECCE Asia), Jun. 2015, 163-169.

Kong et al., "Common mode noise characteristics of resonant converters," 2010 IEEE Energy Conversion Congress and Exposition, Sep. 2010, 1246-1251.

Kong et al., "Transformer structure and its effects on common mode EMI noise in isolated power converters," 2010 Twenty-Fifth Annual IEEE Applied Power Electronics Conference and Exposition (APEC), Feb. 2010, 1424-1429.

Li et al., "Techniques of the modeling, measurement and reduction of common mode noise for a multi-winding switching transformer," 2017 IEEE Applied Power Electronics Conference and Exposition (APEC), Mar. 2017, 2511-2518.

Meng et al., "Characterizing noise source and coupling path in flyback converter for common-mode noise prediction," 2011 Twenty-Sixth Annual IEEE Applied Power Electronics Conference and Exposition (APEC), Mar. 2011, 1704-1709.

PCT International Search Report and Written Opinion in International Appln. No. PCT/US2019/045140, dated Nov. 6, 2019, 41 pages.

Prieto et al., "Optimizing the winding strategy of the transformer in a flyback converter," PESC Record 27th Annual IEEE Power Electronics Specialists Conference, Jun. 1996, 2:1456-1462.

Wang et al., "Common mode noise reduction for boost converters using general balance technique," IEEE transactions on power electronics, Jul. 2007, 22(4):1410-6.

Xie et al., "Equivalent noise source: An effective method for analyzing common-mode noise in isolated power converters," IEEE Transactions on Industrial Electronics, Jan. 2016, 63(5):2913-24.

Xie et al., "Shielding-cancelation technique for suppressing common-mode EMI in isolated power converters," IEEE Transactions on Industrial Electronics, Oct. 2014, 62(5):2814-22.

Xu et al., "Investigating a guard trace ring to suppress the crosstalk due to a clock trace on a power electronics DSP control board," 2014 IEEE International Symposium on Electromagnetic Compatibility (EMC), Aug. 2014, 525-532.

Zhang et al., "Two-capacitor transformer winding capacitance models for common-mode EMI noise analysis in isolated DC-DC converters," IEEE Transactions on Power Electronics, Jan. 2017, 32(11):8458-69.

* cited by examiner

SHIELDED ELECTRICAL TRANSFORMER

CROSS-REFERENCE TO RELATED APPLICATION

This application is a National Stage Application under 35 U.S.C. § 371 and claims the benefit of International Application No. PCT/US2019/045140, filed Aug. 5, 2019, which claims priority to U.S. Application No. 62/715,008, filed Aug. 6, 2018, the disclosure of which is incorporated herein by reference.

BACKGROUND

An electrical transformer uses electromagnetic coupling to transfer energy from one coil to another. The ratio of windings between a primary coil and secondary coil, also called a "turns ratio," sets the relationship between the voltages and currents for the coils. In practice, transformers can have some undesirable effects, such as generation of electromagnetic interference and loss of energy due to eddy currents and other effects.

SUMMARY

In some implementations, a transformer includes shielding that reduces electromagnetic interference (EMI) by generating lower levels of noise. The shielding can have two segments, arranged on opposite sides of the primary coil. A first shielding segment can be connected in series with the primary coil, e.g., as an extension of the primary coil that carries current of the primary coil. This allows the windings of the first shielding segment to act as both shielding and as a portion of the primary coil, with the windings of the first shielding segment contributing to the total turns of the primary coil. The second shielding segment can be arranged so that one terminal is connected to the primary ground and the other terminal is floating. The transformer can have two secondary coils, and the first and second shielding segments can each have a number of turns approximately equal to the number of turns of the secondary coils.

The transformer may be used in various types of power converters. For example, the transformer can be used in an AC-to-DC power adapter or a DC-to-DC power adapter. In some implementations, an AC/DC power adapter for consumer electronics may include isolated DC-to-DC converter circuit that includes a high-frequency transformer as discussed in this document. The high-frequency transformer provides galvanic isolation and can provide high efficiency of power transfer.

Conventional transformers often produce significant amount of common-mode noise, due to the large inter-winding capacitance between primary winding and secondary windings which makes a high-frequency transformer a major conduction path for conductive common-mode noise. To meet common-mode noise requirements, a two-stage EMI filter may be required, which increases volume of a power adapter and cost. Transformers can include shielding to reduce noise, but typical shielding reduces the electrical efficiency of the transformer, for example, due to eddy currents in the shielding windings.

The transformer designs discussed in this document can reduce common-mode noise compared to conventional transformers while providing higher efficiency than typical shielded transformers. For example, connecting the first shielding segment in series with the primary coil avoids eddy current losses that would otherwise be incurred in the first shielding segment. In addition, since the windings of the first shielding segment contribute to the overall turns of the primary coil, the primary coil can be reduced by a corresponding number of turns, allowing the transformer to be smaller than a typical shielded transformer and with lower winding losses. The benefits of lower noise can allow smaller EMI filters, in some instances allowing for only a single EMI filter on the primary side.

In some implementations, a shielded electrical transformer includes: a magnetic core; a primary winding; a first secondary winding and a second secondary winding, the first secondary winding and the second secondary winding having an approximately equal number of turns; and electromagnetic shielding including: a first shielding winding that has a same voltage potential direction as the primary winding and is connected in series with the primary winding to carry current that passes through the primary winding, wherein the first shielding winding has a number of turns approximately equal to the number of turns of each of the secondary windings, and wherein the first shielding winding is located between the primary winding and the first secondary winding; and a second shielding winding that has a voltage potential direction opposite the primary winding and is connected from primary ground to a floating terminal, wherein the second shielding winding has a number of turns approximately equal to the number of turns of each of the secondary windings, and wherein the first shielding winding is located between the primary winding and the second secondary winding.

Implementations may include one or more of the following features. For example, in some implementations, the first shielding winding is arranged uniformly along an interface between the primary winding and the first secondary winding; and wherein the second shielding winding is arranged uniformly along an interface between the primary winding and the second secondary winding.

In some implementations, the secondary windings and the shielding windings have a number of turns that are within 5% of each other.

In some implementations, the shielded electrical transformer comprises wire windings around a ferrite core.

In some implementations, the wire windings are arranged concentrically around a central portion of the ferrite core in a sequence, from inner winding outward, of: one of the secondary windings, one of the shielding windings, the primary winding, the other of the shielding windings, and the other of the secondary windings.

In some implementations, the shielded electrical transformer comprises is implemented using planar magnetics, with the windings being implemented using wire traces on stacked substrate layers.

In some implementations, the stacked substrate layers being arranged along an axis in a sequence, from top to bottom, of one of the secondary windings, one of the shielding windings, the primary winding, the other of the shielding windings, and the other of the secondary windings.

In some implementations, the first shielding winding and the second shielding winding each have a terminal connected to primary ground.

In some implementations, the shielded electrical transformer comprises four secondary windings that each have an approximately equal number of turns. The shielded electrical transformer comprises wire windings around a core. The wire windings are arranged concentrically around a core in a sequence, from inner winding outward, of: a first of the four secondary windings, a second of the four secondary windings, one of the shielding windings, the primary winding, the other of the shielding windings, a third of the four secondary windings, and a fourth of the four secondary windings. Either the first of the four secondary windings or the second of the four secondary windings is one of the first secondary winding or the second secondary winding and either the third of the four secondary windings or the fourth of the four secondary windings is the other of the first secondary winding or the second secondary winding.

In some implementations, the shielded electrical transformer comprises a third secondary winding and a fourth secondary winding, wherein the first secondary winding, the second secondary winding, the third secondary winding, and the fourth secondary winding each have an approximately equal number of turns; wherein the shielded electrical transformer comprises planar magnetic elements, with the windings being arranged as substantially planar coils; wherein the substantially planar coils are stacked along an axis in a sequence, from top to bottom, of: a first of the four secondary windings, a second of the four secondary windings, one of the shielding windings, the primary winding, the other of the shielding windings, a third of the four secondary windings, and a fourth of the four secondary windings. Either the first of the four secondary windings or the second of the four secondary windings is one of the first secondary winding or the second secondary winding, and either the third of the four secondary windings or the fourth of the four secondary windings is the other of the first secondary winding or the second secondary winding.

In some implementations, the first of the four secondary windings and the second of the four secondary windings have opposite voltage potential directions; and the third of the four secondary windings and the fourth of the four secondary windings have opposite voltage potential directions.

In some implementations, the shielded electrical transformer has four secondary windings that each have an approximately equal number of windings; a first set of two of the secondary windings that are arranged with the primary winding and shielding windings between them are configured such that the first set of two of the secondary windings (i) have the same voltage potential direction and (ii) are connected in series to act as a single effective secondary coil; a second set of two of the secondary windings that are arranged with the primary winding and shielding windings between them are configured such that the second set of two of the secondary windings (i) have the same voltage potential direction and (ii) are connected in series to act as a single effective secondary coil; the secondary windings in the first set are distinct from the secondary windings in the second set; and the voltage potential direction for the secondary windings of the first set is opposite the voltage potential direction for the secondary windings of the second set.

In some implementations, the shielded electrical transformer is configured to use the first shielding winding as part of the primary winding, such that use of the transformer steps down voltage provided to the primary winding with an effective turns ratio between the primary side of the shielded electrical transformer and one of the secondary windings is a ratio between (i) a sum of turns of the primary winding and the first shielding winding, and (ii) a number of turns of one of the secondary windings.

In some implementations, the first shielding winding is arranged with a same structure as the first secondary winding such that a substantially equivalent voltage potential is induced in the first shielding winding and the first secondary winding; and the second shielding winding is arranged with a same structure as the first secondary winding such that a substantially equivalent voltage potential is induced in the second shielding winding and the second secondary winding.

In some implementations, the electromagnetic shielding is arranged such that there is no common-mode current between the electromagnetic shielding windings and corresponding secondary windings.

In some implementations, the shielded electrical transformer is configured to induce common-mode current from the primary winding to the electromagnetic shielding, and cause the common-mode current to flow back to primary ground such that the common-mode current only circulates in the primary side and there is no common-mode current passed between primary winding and secondary windings.

Other implementations include an AC-DC power adapter comprising the shielded electrical transformer. The AC-DC power adapter may include switches, coupled to the secondary windings, that are configured to operate as part of a synchronous rectifier.

Other implementations include a DC-DC converter comprising the shielded electrical transformer. The DC-DC converter may include switches, coupled to the secondary windings, that are configured to operate as part of a synchronous rectifier.

Other implementations include a method of converting alternating current from one voltage to another using the shielded electronic transformer.

Other implementations include a method comprising converting alternating current to direct current using the AC-DC power adapter.

Other implementations include a method comprising converting a first direct current voltage to a second, different direct current voltage using the DC-DC converter.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
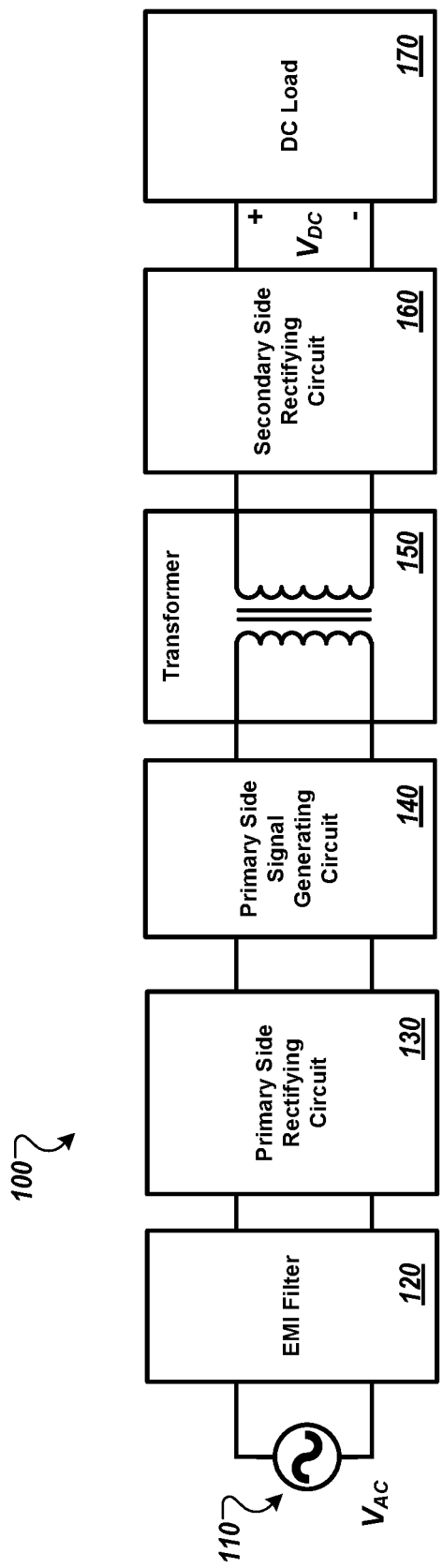
FIG. 1 is a block diagram illustrating an example of an AC-to-DC power adapter that uses a shielded transformer.

FIG. 1 is a block diagram illustrating an example of an AC-to-DC power adapter 100 that uses a shielded transformer 150. This example uses the transformer 150 as part of a high-efficiency DC-to-DC conversion circuit. Other adapter designs can use a shielded transformer in other ways, such as to directly step down alternating current (AC) input to a lower-voltage alternating current. The adapter 100 may be a standalone adapter or may be integrated into a device powered by the adapter 100. In some implementations, the power adapter 100 is a Universal Serial Bus (USB) Type-C adapter, which may be able to provide output ranging from approximately 3V to approximately 20V.

The adapter 100 in FIG. 1 includes an EMI filter 120, a primary-side rectifying circuit 130, a primary-side signal generating circuit 140, the shielded transformer 150, and a secondary-side rectifying circuit 160. The adapter 100 receives power from an AC power source 110, such as an electrical outlet. The adapter 100 provides DC power to a load 170.

In further detail, AC input is provided to the EMI filter 120, which may at least partially suppress conducted EMI from the power source. This may involve various passive components, e.g., capacitors and/or inductors, which may be arranged to reduce common-mode noise and/or differential-mode noise. For example, inductive portions of the filter can act as a low-frequency pass device for AC line signals, while blocking higher frequencies. To suppress common-mode noise, inductors placed in series with each AC power line, and capacitors can be connected from both power lines to ground. One or more capacitors connected from one AC power line to the other can reduce differential-mode noise.

Output of the EMI filter 120 is provided to the primary-side rectifying circuit 130, which can use any of various types of rectifiers, e.g., a switching rectifier, a diode bridge rectifier, a center-tapped transformer rectifier, and so on. The rectifying circuit 130 can optionally include further filtering or voltage adjustment circuitry.

Figure 2:
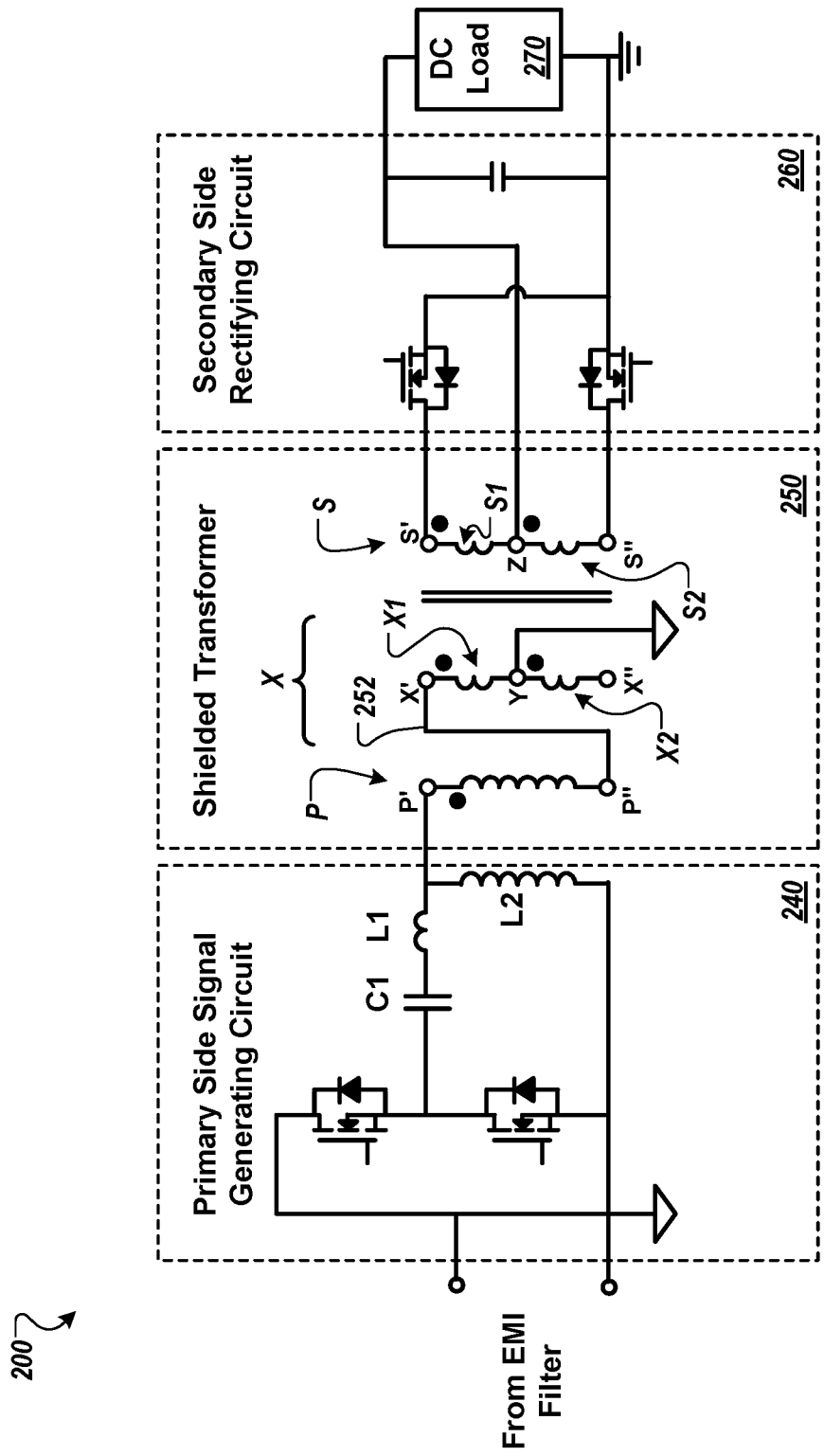
FIG. 2 is a block diagram illustrating an example of a DC-to-DC conversion circuit that uses a shielded transformer.
Figure 4:
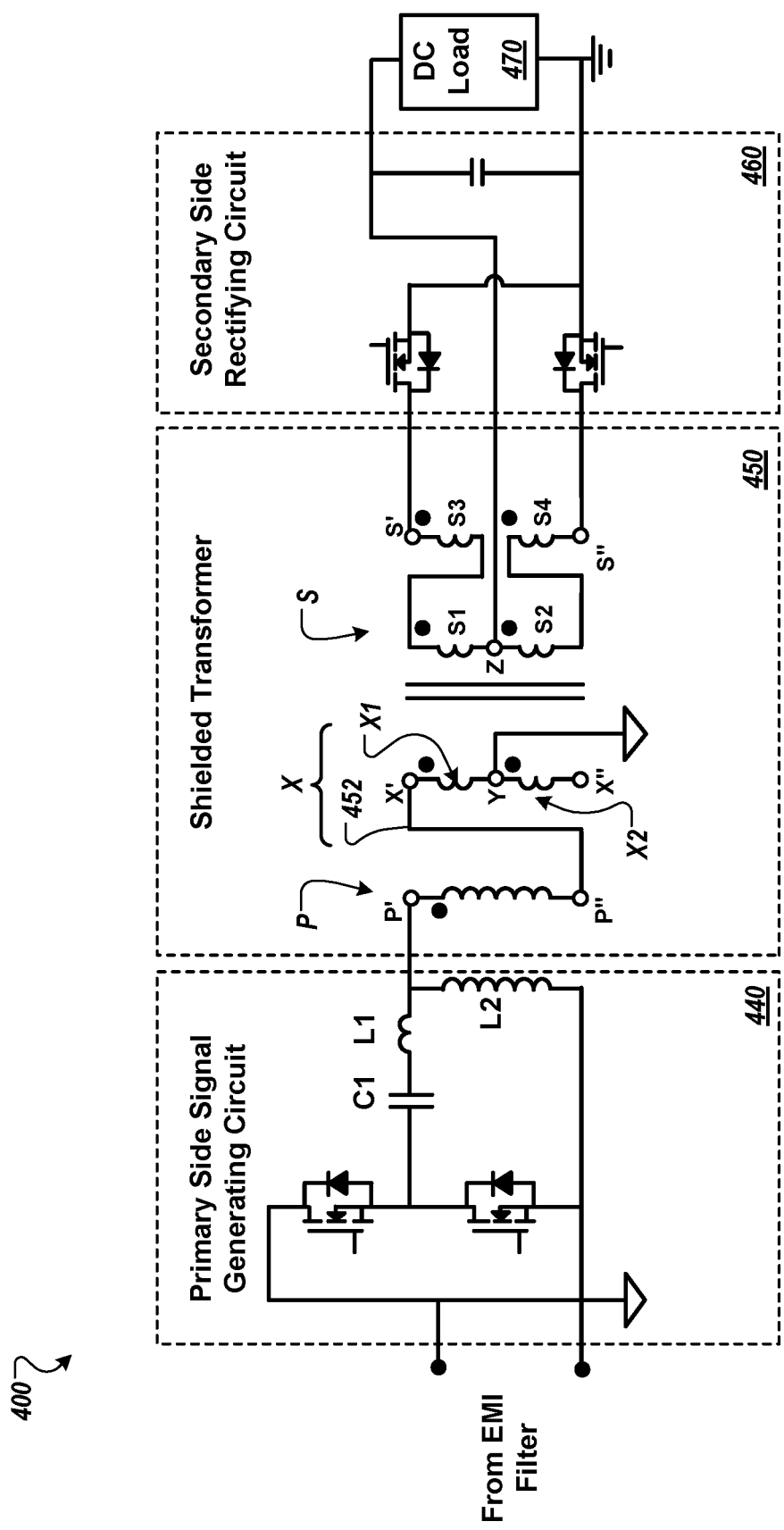
FIG. 4 is a block diagram illustrating an example of a DC-to-DC conversion circuit that uses a shielded transformer.

The primary-side signal generating circuit 140, the transformer 150, and the secondary-side rectifying circuit 160 form a DC-to-DC conversion circuit, and examples are shown in FIGS. 2 and 4. The primary-side signal generating circuit 140 includes, for example, switching components to generate a switched signal from the output of rectifying circuit 130 and a tank circuit. For example, this switched signal may be generated using a pulse-frequency modulation (PFM). This would provide a fixed 50% duty cycle for the primary-side signal generating circuit 140, with the frequency being adjustable to change the output of the converter. The switched signal can be provided to a tank circuit, such as an LLC tank, which filters the switched signal before the filtered signal is provided to the transformer 150, which typically steps down the voltage from the primary side to the secondary side. The output at the secondary side of the transformer 150 is then rectified by the secondary-side rectifying circuit 160, which may use a switching rectifier, a diode bridge rectifier, or other rectifier circuit to generate a DC output. Although not illustrated, the DC output may optionally be processed further, e.g., with a filter, a switching converter, a voltage regulator, etc. The DC output (as optionally further processed) is then provided to DC load 170, which may be any of various types of electronic devices, e.g., a phone, a laptop computer, an appliance, an entertainment device, and so on.

In some implementations, the DC-to-DC conversion circuit of FIG. 1, as with the others discussed below, operates at a relatively high frequency. For example, while frequencies of about 150 kHz are typical, the frequency of the DC-to-DC conversion circuit is instead approximately 200 kHz, 250 kHz, 300 kHz, 400 kHz, or more, and the primary-side signal generating circuit 140, transformer 150, and secondary-side rectifying circuit 160 are designed for the higher frequency.

FIG. 2 is a block diagram illustrating an example of a DC-to-DC conversion circuit 200 that uses a shielded transformer 250. The circuit 200 includes a primary-side signal generating circuit 240, a shielded transformer 250, and a secondary-side rectifying circuit 260 which show an implementation of the corresponding elements 140, 150, and 160 of FIG. 1.

The primary-side signal generating circuit 240 receives AC input from an EMI filter. Two transistors are controlled to produce a switched output with a 50% duty cycle using PFM. A capacitor C1, a series inductor L1, and a parallel inductor L2 form an LLC tank circuit that smooths the switched output from the transistors. The output of the primary-side signal generating circuit 240, e.g., at the node connecting inductors L1 and L2, is provided to the primary side of the shielded transformer 250.

The shielded transformer 250 has a primary side P, shielding X, and a secondary side S. In the example illustrated, the primary side P includes a single primary coil that has two terminals P' and P''', one at each end. The terminal P' is connected to receive the output of the primary-side signal generating circuit 240. The terminal P''' is connected to the shielding, X, through connection 252.

The shielding X has two segments: a first shielding segment X1 and a second shielding segment X2. The two shielding segments X1, X2 each have a terminal connected to the primary ground, illustrated as the connection at terminal Y. For example, the primary ground can be the same ground reference used by the primary side signal generating circuit 240. The other ends of the shielding segments X1, X2 are connected differently.

This first shielding segment X1 has a voltage potential direction that is the same as the primary coil P. The first shielding segment X1 has a terminal X' that is connected to the terminal P''' of the primary coil P (e.g., through connection 252). As a result, current that flows through the primary coil P also flows through the first shielding segment X1. This causes the first shielding segment X1 to serve as part of the primary coil P as well as shielding. In particular, the first shielding segment X1 is used for both high-frequency shielding and for power transfer. This arrangement allows the transformer 250 to reduce power loss compared to an arrangement in which both shielding segments have floating or free ends.

The second shielding segment X2 has a terminal X'' that is left floating, e.g., unconnected. This second shielding segment X2 has a voltage potential direction opposite the primary coil P. The difference in voltage potential directions can be achieved by winding the second shielding segment X2 in a direction opposite the primary coil. As an alternative, in some implementations, the effect can be obtained by winding the second shielding segment X2 in the same direction as the primary coil P but by reversing the connections of the second shielding segment X2 so that the polarity or voltage potential direction is also reversed. A high change in voltage over time (dv/dt) at the primary side P will induce common-mode current from the primary coil P to the shielding, and this common-mode current will then flow back to primary ground through node Y. The common-mode current only circulates in the primary side P, and there is no common-mode current between the primary side P and secondary side S.

The secondary side S of the transformer 250 has two secondary segments S1 and S2. These are arranged so that they conduct in opposite directions. For example, the two secondary segments S1 and S2 are connected with each having a common terminal connected at node Z which is provided as the output to the load 270. When current is flowing into node Z from segment S1, it would flow out of node Z through segment S2. However, in use current only flows through one of the secondary segments S1, S2 at a time because only one path is allowed at any given time by the secondary-side rectifying circuit 260. As illustrated, the secondary-side rectifying circuit 260 includes transistors that act as a synchronous switching rectifier, controlled synchronously with the transistors of the primary-side signal generating circuit 240. By alternating which of the switches are open, the output is alternated between the secondary segments S1, S2, so that a rectified output is provided from the differing polarities of the secondary segments S1, S2 with respect to the load 270.

The secondary windings S1, S2 have an approximately equal number of turns. In general, an approximately equal number of turns or a substantially equal number of turns indicates that the number of turns is within 10% of each other. Of course, the tolerance may be much closer, such as within 5%, or within 2.5%, or within 1%, within one turn of each other, or even an exact match in the number of turns.

The shielding segments X1, X2 each have a number of turns approximately equal to each other and to the number of turns of the secondary segments S1, S2. Thus, the number of turns of shielding segment X1 may be within 10% of the number of turns of secondary segment S1, and the number of turns of shielding segment X2 may be within 10% of the number of turns of secondary segment S2. Of course, the tolerance may be much closer, such as within 5%, or within 2.5%, or within 1%, within one turn of each other, or even an exact match in the number of turns. Having approximately the same turns for the shielding segments X1, X2 and the secondary segments S1, S2 is beneficial so the same voltage potential will exist on the shielding segments as on the secondary segments S1, S2. As a result, there is no common-mode current between the shielding segments X1, X2 and the secondary segments S1, S2.

As discussed further below, the shielding segments X1, X2 can be placed on opposite sides of the primary coil P, with one shielding segment located between the primary coil P and each of the secondary coils S1, S2. Each shielding segment can be uniformly distributed along the boundary between the primary coil P and the nearest secondary coil.

Figure 3A:
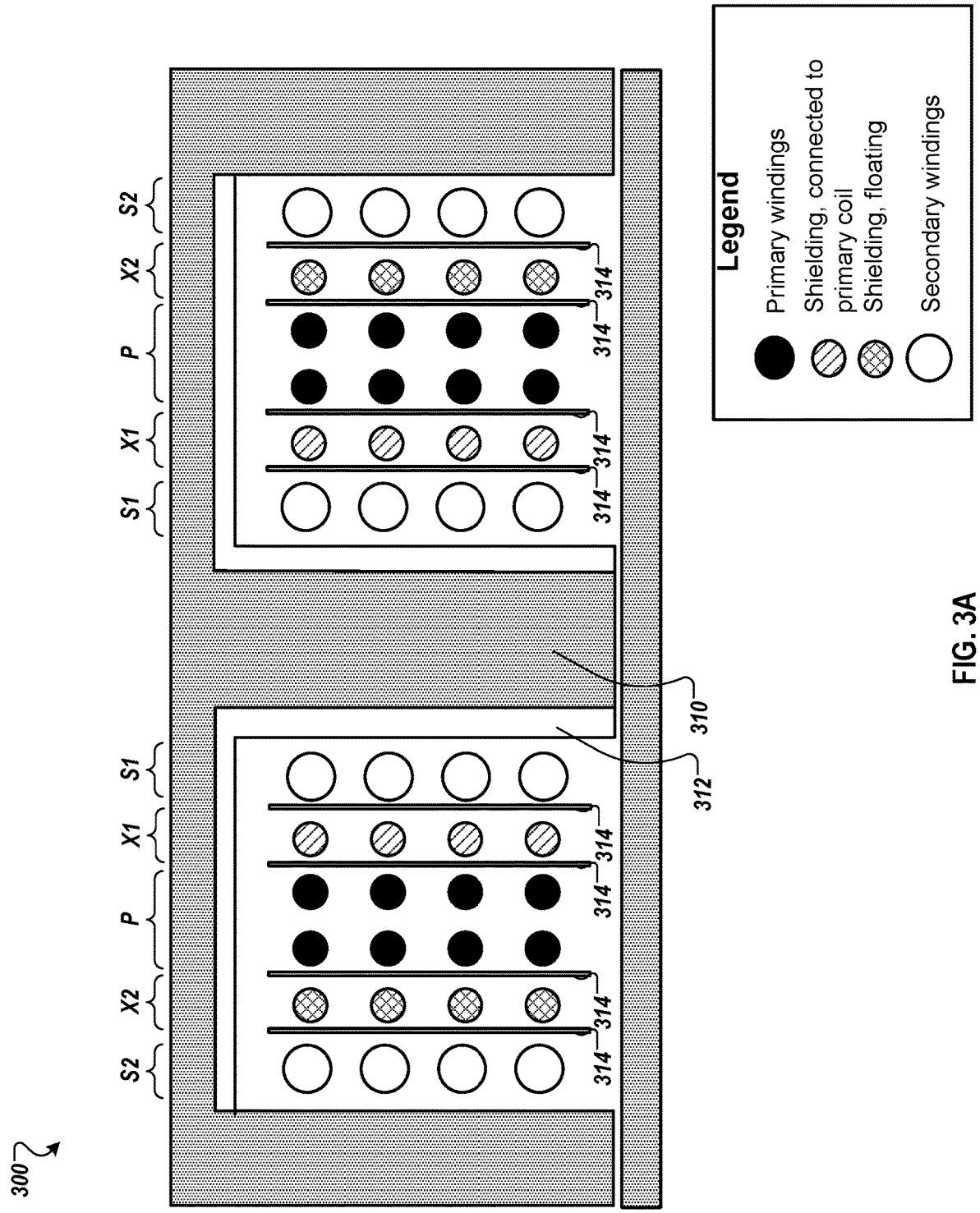
FIGS. 3A and 3B are cutaway views of examples of shielded transformers for the circuit of FIG. 2.

FIG. 3A is cutaway view of an example of a shielded transformer 300 that can be used as the transformer 250 of FIG. 2. This figure shows an implementation of a wire-wound transformer having the coils wrapped concentrically around a ferrite core 310, and optionally also around a bobbin 312. The various layers can be separated by an insulating material, such as one or more layers of insulating tape 314 providing a few thousand volts of isolation.

The inner-most windings represent the first secondary segment S1. The next windings show the first shielding segment X1, which is electrically connected in series with the primary windings P which are wrapped around the first shielding segment X1. The same current flowing through the primary windings P also flows through first shielding segment X1. The second shielding segment X2 is then wound around the primary windings P. As explained above, the second shielding segment X2 does not carry current from the primary windings P. Instead, as shown in FIG. 2, the second shielding segment X2 has a terminal connected to primary ground, Y, and another terminal X" that is left floating. The second secondary segment S2 is then wrapped around the second shielding segment X2.

The shielding segments X1, X2 can be wire windings of similar wire gauge and material as the primary P or secondary S1, S2 windings. Alternatively, the shielding segments X1, X2 can be formed of a different gauge or type of wire or another conductor, e.g., solid wire, litz wire, conductive foil, trace on a PCB layer, etc.

In this example, the secondary segments S1, S2 each have the same number of turns, and the shielding segments X1, X2 have the same number of turns as the secondary segments S1, S2. The turns of the shielding segment X1 act as part of the primary winding, so the overall turns ratio between the primary winding P and each secondary winding S1, S2 is 3:1. Of course, the transformer 300 can be implemented in any appropriate turns ratio needed for the application in which it will be used.

Figure 3B:
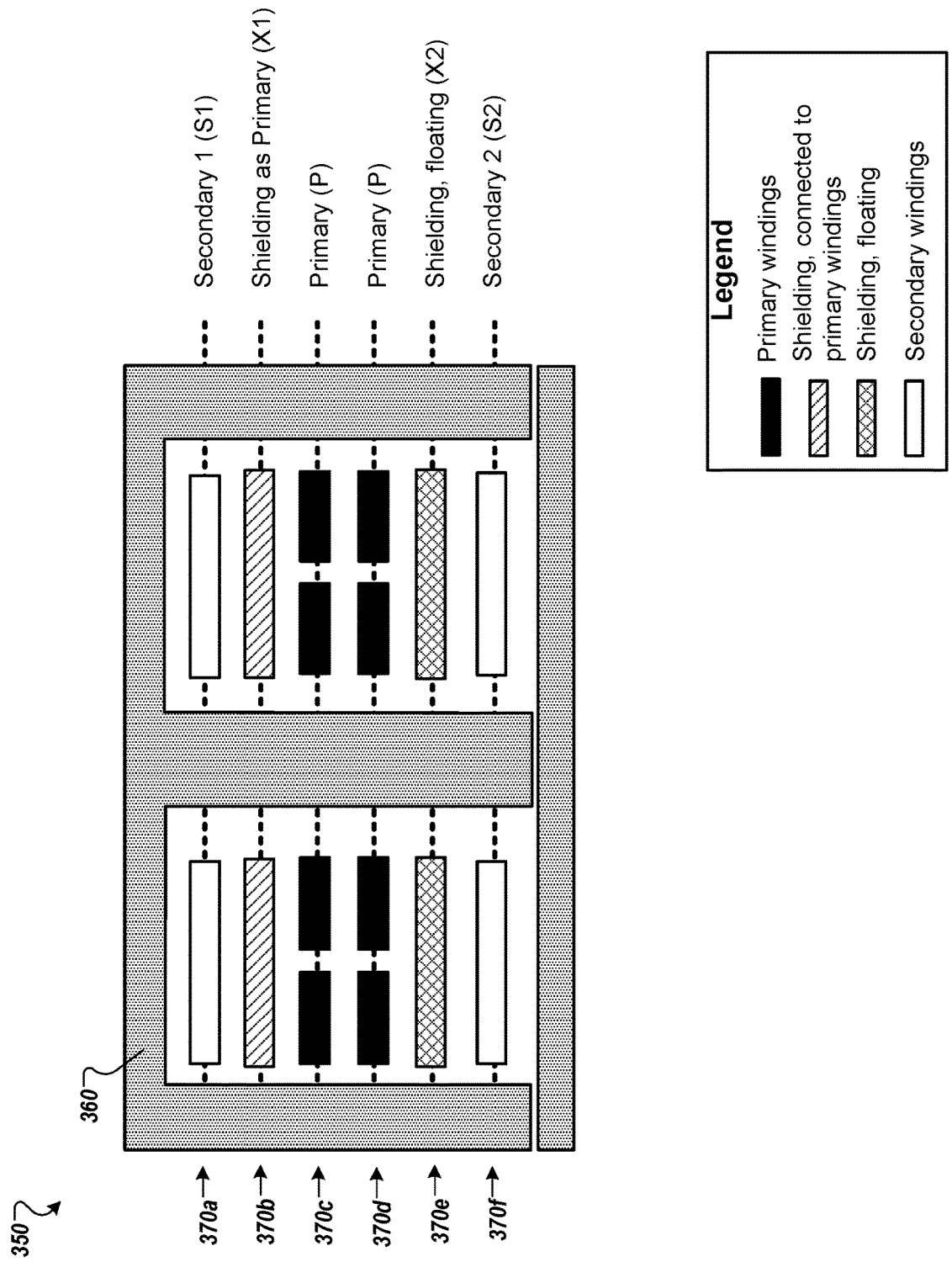

FIG. 3B is cutaway view of an example of another shielded transformer 350 that can be used as the transformer 250 of FIG. 2. The transformer 350 is implemented using planar magnetics, e.g., using wire traces on printed circuit board (PCB) layers or multiple PCBs. In the illustration, elements 370a-370f represent different PCB layers or PCB elements. Each element 370a-370f may include multiple layers of a substrate or even multiple discrete substrate elements to carry the coils represented. Similarly, various elements 370a-370f may be combined into a single substrate to carry the coils shown.

The transformer 350 has a core 360, such as a ferrite material, and has coils carried on approximately planar substrate elements 3701-370f, such as PCB layers. From top to bottom, element 370a carries the coil for secondary segment S1, element 370b carries the coil for shielding segment X1, which is connected to receive current through the primary coil P. Elements 370c and 370d carry the primary coil P. Element 370e carries the shielding segment X2, which is connected to the primary ground and has a floating end. Element 370f carries the second secondary segment S2.

In FIG. 3B, the cross-sectional elements of the coils are provided as a simple indication of the relative number of turns for the coils. Of course, the actual number of turns for each coil will vary according to the application in which the transformer 350 will be used. In this example, the shielding segments X1, X2 have the same number of turns, and the number of turns matches the number of turns of the secondary segments S1, S2. The overall turns ratio between the primary coil P and the each individual secondary segment S1, S2 is 5:1. The two primary layers each show two turns, and the shielding segment X1 contributes another turn to the primary, for a total of five in the illustration, while the secondary segments S1, S2 each are shown with a single turn.

FIG. 4 is a block diagram illustrating an example of a DC-to-DC conversion circuit 400 that uses a shielded transformer 450. The circuit 400 has features as discussed for the circuit 200 above, with a primary-side signal generating circuit 440, a shielded transformer 450, and a secondary-side rectifying circuit 460 having a structure and operation generally as discussed above for elements 240, 250, and 260 of FIG. 2. However, the transformer 450 has a different arrangement of secondary segments compared to the transformer 250, as discussed below.

In FIG. 4, there are four secondary segments, S1, S2, S3, and S4 rather than two as shown in FIG. 2. The secondary segments S1, S2, S3, and S4 and the shielding segments X1 and X2 can each have approximately the same number of turns. As discussed above, an approximately equal number of turns or a substantially equal number of turns indicates that the number of turns is within 10% of each other. Of course, the tolerance may be much closer, such as within 5%, or within 2.5%, or within 1%, within one turn of each other, or even an exact match in the number of turns.

The secondary segments S1 and S3 have the same voltage potential direction with respect to the load 470 and are connected in series to act as one secondary coil. Similarly, secondary segments S2 and S4 have the same voltage potential direction with respect to the load 470 and are connected in series to act as another secondary coil. The two effective secondary coils, e.g., S1+S3 and S2+S4, have voltage potential directions opposite each other. In other words, alternating current from the primary coil can induce current in the two effective secondary coils in opposite directions. The difference in voltage potential directions can be achieved by changing the winding directions. For example, secondary segments S1 and S3 can both be wound in a first direction, while secondary segments S2 and S4 are both wound in a second, opposing direction. As an alternative, in some implementations, each of the secondary segments S1-S4 can be wound in the same direction, but the connections of one pair (e.g., S1 and S3) can be opposite the connections of the other pair (e.g., S2 and S4) so that the polarity or voltage potential direction is also reversed.

Figure 5A:
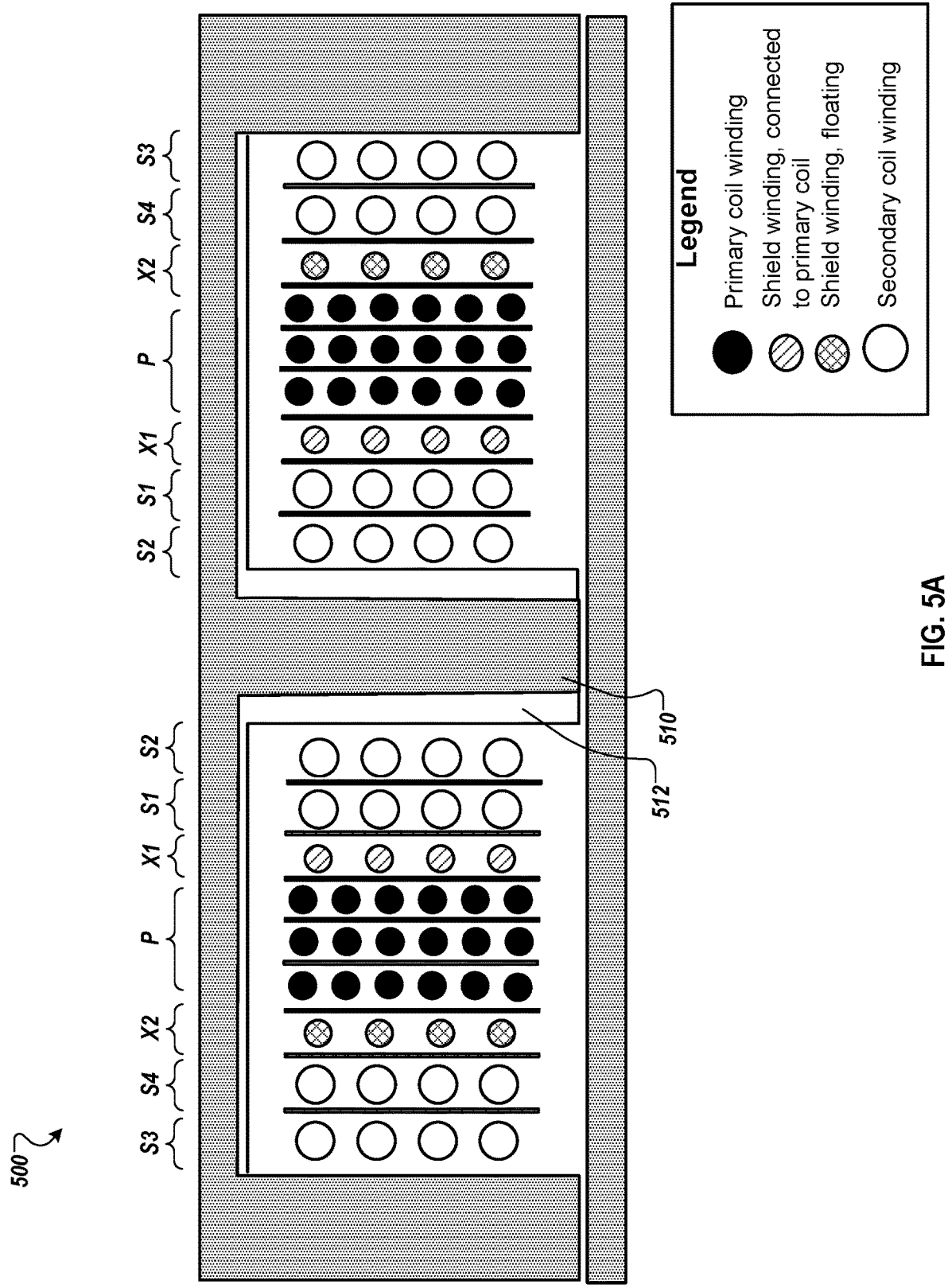
FIGS. 5A and 5B are cutaway views of examples of shielded transformers for the circuit of FIG. 4.

As an example, the secondary segments S1-S4 may all be wound in the same direction and each segment S1-S4 has a top terminal (e.g., at the top winding of FIG. 5A) and a bottom terminal (e.g., at the bottom of FIG. 5A). Given the same winding directions, the top terminals can be the ones represented by the dark circle polarity indicator of FIG. 4. The node Z can be connected to the top terminal of secondary segment S2 and the bottom terminal of secondary segment S1. The secondary terminal S3 is then connected with its bottom terminal connected to the top terminal of secondary segment S1 and with its top terminal to one of the transistors of the secondary side rectifying circuit 460. The secondary terminal S4 is then connected with its top terminal connected to the bottom terminal of secondary segment S1 and with its bottom terminal to the other transistor of the secondary side rectifying circuit 460.

Figure 5B:
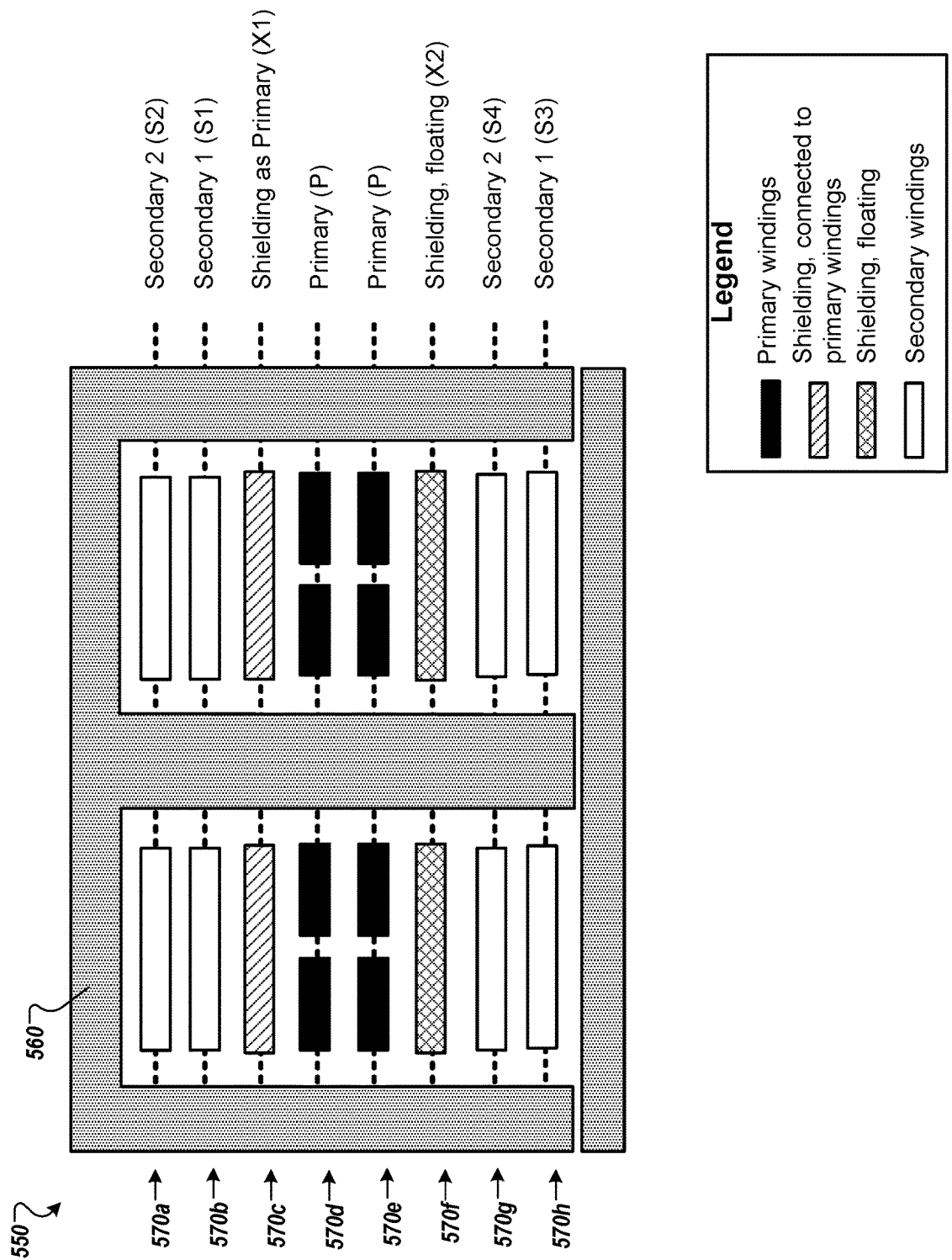

As shown in FIGS. 5A and 5B, the each effective secondary coil is composed of a coil physically arranged on opposite sides of the primary coil P. For example, secondary segments S1 and S2 are placed on one side of the primary coil P, with shielding segment X1 between these segments S1, S2 and the primary coil P. Secondary segments S3 and S4 are placed on the other side of the primary coil P, with shielding segment X2 between these segments S3, S4 and the primary coil P.

FIGS. 5A and 5B are cutaway views of examples of shielded transformers for the circuit of FIG. 4.

FIG. 5A shows an implementation of a wire-wound transformer 500 having the coils wrapped concentrically around a ferrite core 510, and optionally also around a bobbin 512. In the transformer 500, the inner windings are the secondary segments S2 and S1, which are part of different secondary coils as shown in FIG. 4. Similarly, the outer windings are secondary segments S3 and S4, which are also part of different secondary coils. The turns ratio between the primary coil and each secondary coil (e.g., the combination of S1+S3 and the combination of S2+S4) is 11:4 or 2.75:1. Other features of the transformer 500 are as described for transformer 300 of FIG. 3A.

FIG. 5B shows an implementation using planar magnetics, with elements 570a-570h representing different layers or substrate elements carrying the conductors of the various coils. The secondary coil S1+S3 and the secondary coil S2+S4 each include one segment below the primary coil P and one segment above the primary coil P. In this example, the turns ratio between the primary coil and each secondary coil (e.g., the combination of S1+S3 and the combination of S2+S4) is 5:2 or 2.5:1. Other features of the transformer 550 are as described for transformer 350 of FIG. 3B.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Thus, particular embodiments of the invention have been described. Other embodiments are within the scope of the following claims. For example, the actions recited in the claims may be performed in a different order and still achieve desirable results.

What is claimed is:
1. A shielded electrical transformer comprising:
a magnetic core;
a primary winding;
a first secondary winding and a second secondary winding, the first secondary winding and the second secondary winding having an approximately equal number of turns; and
electromagnetic shielding comprising:
  a first shielding winding that has a same voltage potential direction as the primary winding and is connected in series with the primary winding to carry current that passes through the primary winding, wherein:
    a first terminal of the first shielding winding is connected with the primary winding,
    a second terminal of the first shielding winding is connected with primary ground and a first terminal of a second shielding winding,
    the first shielding winding has a number of turns approximately equal to the number of turns of each of the secondary windings, and
    the first shielding winding is located between the primary winding and the first secondary winding; and
  the second shielding winding that has a voltage potential direction opposite the primary winding, has the first terminal connected to primary ground, and a second terminal that is a floating terminal, wherein:
    the second shielding winding has a number of turns approximately equal to the number of turns of each of the secondary windings, and the second shielding winding is located between the primary winding and the second secondary winding.

2. The shielded electrical transformer of claim 1, wherein the first shielding winding is arranged uniformly along an interface between the primary winding and the first secondary winding; and
wherein the second shielding winding is arranged uniformly along an interface between the primary winding and the second secondary winding.

3. The shielded electrical transformer of claim 1, wherein the secondary windings and the shielding windings have a number of turns that is within 5% of each other.

4. The shielded electrical transformer of claim 1, wherein the first shielding winding and the second shielding winding each have a terminal connected to primary ground.

5. The shielded electrical transformer of claim 1, wherein the shielded electrical transformer comprises wire windings around a ferrite core.

6. The shielded electrical transformer of claim 1, wherein the shielded electrical transformer is implemented using planar magnetics, with the windings being implemented using wire traces on stacked substrate layers.

7. The shielded electrical transformer of claim 6, wherein the stacked substrate layers being arranged along an axis in a sequence, from top to bottom, of one of the secondary windings, one of the shielding windings, the primary winding, the other of the shielding windings, and the other of the secondary windings.

8. The shielded electrical transformer of claim 1, wherein the shielded electrical transformer comprises four secondary windings that each have an approximately equal number of turns;
wherein the shielded electrical transformer comprises wire windings around a core;
wherein the wire windings are arranged concentrically around a core in a sequence, from inner winding outward, of:
a first of the four secondary windings,
a second of the four secondary windings,
one of the shielding windings,
the primary winding,
the other of the shielding windings,
a third of the four secondary windings, and
a fourth of the four secondary windings,
wherein either the first of the four secondary windings or the second of the four secondary windings is one of the first secondary winding or the second secondary winding; and
wherein either the third of the four secondary windings or the fourth of the four secondary windings is the other of the first secondary winding or the second secondary winding.

9. The shielded electrical transformer of claim 1, wherein the shielded electrical transformer comprises a third secondary winding and a fourth secondary winding, wherein the first secondary winding, the second secondary winding, the third secondary winding, and the fourth secondary winding each have an approximately equal number of turns;
wherein the shielded electrical transformer comprises planar magnetic elements, with the windings being arranged as substantially planar coils;
wherein the substantially planar coils are stacked along an axis in a sequence, from top to bottom, of:
a first of the four secondary windings,
a second of the four secondary windings,
one of the shielding windings,
the primary winding,
the other of the shielding windings,
a third of the four secondary windings, and
a fourth of the four secondary windings,
wherein either the first of the four secondary windings or the second of the four secondary windings is one of the first secondary winding or the second secondary winding; and
wherein either the third of the four secondary windings or the fourth of the four secondary windings is the other of the first secondary winding or the second secondary winding.

10. The shielded electrical transformer of claim 8, wherein the first of the four secondary windings and the second of the four secondary windings have opposite voltage potential directions; and
wherein the third of the four secondary windings and the fourth of the four secondary windings have opposite voltage potential directions.

11. The shielded electrical transformer of claim 1, wherein the shielded electrical transformer has four secondary windings that each have an approximately equal number of windings;
wherein a first set of two of the secondary windings that are arranged with the primary winding and shielding windings between them are configured such that the first set of two of the secondary windings (i) have the same voltage potential direction and (ii) are connected in series to act as a single effective secondary coil; and
wherein a second set of two of the secondary windings that are arranged with the primary winding and shielding windings between them are configured such that the second set of two of the secondary windings (i) have the same voltage potential direction and (ii) are connected in series to act as a single effective secondary coil;
wherein the secondary windings in the first set are distinct from the secondary windings in the second set; and
wherein the voltage potential direction for the secondary windings of the first set is opposite the voltage potential direction for the secondary windings of the second set.

12. The shielded electrical transformer of claim 1, wherein the shielded electrical transformer is configured to use the first shielding winding as part of the primary winding, such that use of the transformer steps down voltage provided to the primary winding with an effective turns ratio between the primary side of the shielded electrical transformer and one of the secondary windings is a ratio between (i) a sum of turns of the primary winding and the first shielding winding, and (ii) a number of turns of one of the secondary windings.

13. The shielded electrical transformer of claim 1, wherein the first shielding winding is arranged with a same structure as the first secondary winding; and
wherein the second shielding winding is arranged with a same structure as the first secondary winding.

14. The shielded electrical transformer of claim 1, wherein the electromagnetic shielding is arranged such that there is no common-mode current between the electromagnetic shielding windings and corresponding secondary windings.

15. The shielded electrical transformer of claim 1, wherein the shielded electrical transformer is configured to induce common-mode current from the primary winding to the electromagnetic shielding, and cause the common-mode current to flow back to primary ground such that the common-mode current only circulates in the primary side and there is no common-mode current passed between primary winding and secondary windings.

16. A shielded electrical transformer comprising:
a magnetic core;
a primary winding;
a first secondary winding and a second secondary winding, the first secondary winding and the second secondary winding having an approximately equal number of turns; and
electromagnetic shielding comprising:
a first shielding winding that has a same voltage potential direction as the primary winding and is connected in series with the primary winding to carry current that passes through the primary winding, wherein:
the first shielding winding has a number of turns approximately equal to the number of turns of each of the secondary windings, and
the first shielding winding is located between the primary winding and the first secondary winding; and
a second shielding winding that has a voltage potential direction opposite the primary winding and is connected from primary ground to a floating terminal, wherein:
the second shielding winding has a number of turns approximately equal to the number of turns of each of the secondary windings, and
the second shielding winding is located between the primary winding and the second secondary winding;
wherein the shielded electrical transformer comprises wire windings around a ferrite core and the wire windings are arranged concentrically around a central portion of the ferrite core in a sequence, from inner winding outward, of:
one of the secondary windings,
one of the shielding windings,
the primary winding,
the other of the shielding windings, and
the other of the secondary windings.

17. A power adapter comprising:
a shielded electrical transformer, wherein the shielded electrical transformer comprises a magnetic core, a primary winding, a first secondary winding, a second secondary winding, and electromagnetic shielding, wherein the first secondary winding and the second secondary winding have an approximately equal number of turns, and wherein the electromagnetic shielding comprises:
a first shielding winding that has a same voltage potential direction as the primary winding and is connected in series with the primary winding to carry current that passes through the primary winding, wherein:
a first terminal of the first shielding winding is connected with the primary winding,
a second terminal of the first shielding winding is connected with primary ground and a first terminal of a second shielding winding,
the first shielding winding has a number of turns approximately equal to the number of turns of each of the secondary windings, and
the first shielding winding is located between the primary winding and the first secondary winding; and
the second shielding winding that has a voltage potential direction opposite the primary winding, has the first terminal connected to primary ground and a second terminal that is a floating terminal, wherein:
the second shielding winding has a number of turns approximately equal to the number of turns of each of the secondary windings, and
the first shielding winding is located between the primary winding and the second secondary winding.

18. The power adapter of claim 17, comprising switches, coupled to the secondary windings, that are configured to operate as part of a synchronous rectifier.

19. A method comprising:
receiving electrical power at a primary-side signal-generating circuit configured to produce a switched signal;
providing the switched signal to a primary winding of a shielded electrical transformer, wherein the shielded electrical transformer comprises a magnetic core, the primary winding, a first secondary winding, a second secondary winding, and electromagnetic shielding, wherein the first secondary winding and the second secondary winding have an approximately equal number of turns, and wherein the electromagnetic shielding comprises:
a first shielding winding that has a same voltage potential direction as the primary winding and is connected in series with the primary winding to carry current that passes through the primary winding, wherein:
a first terminal of the first shielding winding is connected with the primary winding,
a second terminal of the first shielding winding is connected with primary ground and a first terminal of a second shielding winding,
the first shielding winding has a number of turns approximately equal to the number of turns of each of the secondary windings, and
the first shielding winding is located between the primary winding and the first secondary winding; and
the second shielding winding that has a voltage potential direction opposite the primary winding, has the first terminal connected to primary ground, and a second terminal that is a floating terminal, wherein:
the second shielding winding has a number of turns approximately equal to the number of turns of each of the secondary windings, and
the second shielding winding is located between the primary winding and the second secondary winding; and
providing output from at least one of the secondary windings to a rectifier to generate a DC voltage.

* * * * *